United States Patent [11] 3,564,271

[72] Inventor Richard E. Nearman
Mount Airy, Md.
[21] Appl. No. 728,514
[22] Filed May 13, 1968
[45] Patented Feb. 16, 1971
[73] Assignee Automated Handling Systems Inc.
Washington, D.C.

[54] CONVEYOR CODING APPARATUS
8 Claims, 4 Drawing Figs.

[52] U.S. Cl. 250/223; 198/38; 214/11
[51] Int. Cl. G06m 7/00
[50] Field of Search 250/223, 219 (IPD); 198/38; 214/11, (Inquired)

[56] References Cited

UNITED STATES PATENTS

| | | | |
|---|---|---|---|
| 2,922,893 | 1/1960 | Ett | 198/38AX |
| 3,171,362 | 3/1965 | Noye et al. | 198/38X |
| 3,227,886 | 1/1966 | Dunigan et al. | 209/111.7X |
| 3,317,714 | 5/1967 | Hauser et al. | 198/38X |
| 3,321,063 | 5/1967 | Blumc | 209/111.7 |
| 2,751,090 | 6/1956 | Gourdon | 214/11 |

FOREIGN PATENTS

| | | | |
|---|---|---|---|
| 831,682 | 3/1960 | Great Britain | 209/111.7 |
| 873,426 | 7/1961 | Great Britain | 198/38 |

*Primary Examiner*—James W. Lawrence
*Assistant Examiner*—C. M. Leedon
*Attorney*—Littlepage, Quaintance & Wray

ABSTRACT: Described herein are light coding apparatus having moveable cones and plates with upward reflective spots and horizontal visual indicia for use with conventional focused light sources and photoelectric cells, which have particular application to the conveyor art where accurate designations of instructions for operations depend on accurate carrier identification as carriers pass stations.

PATENTED FEB 1 6 1971 3,564,271

INVENTOR
RICHARD E. NEARMAN

Littlepage, Quaintance & Wray
ATTORNEYS

CONVEYOR CODING APPARATUS

BACKGROUND OF THE INVENTION

The problem solved by the present invention is one which has recently become important in the growing materials handling art. As sophisticated equipment becomes capable of performing more functions with no direct human supervision, the need arises to code materials so that they may be successively treated according to predetermined plans.

Using light sources and photoelectric cells, retroflective tapes have been attached to cartons and carriers for keying signal circuits as the cartons or carriers pass fixed light sources and reflection sensors. Known devices have inherent disadvantages which this invention overcomes. Carriers, which are expensive, are disfigured by repeated applications of tapes, and direct application of reflective tapes on carriers and cartons requires time consuming precision. Removing old reflective tape and applying new patches of tape in old optical coding systems require time and precision work upon each resetting.

A few optical coding devices use permanent adjustable mountings for reflective patches. However, drawbacks are present in those devices.

Known resettable systems require complex coding apparatus to provide mobility and accuracy. Existing systems which employ moveable reflective patches with fixed light sources and photosensitive apparatus have directly related reflective patches and indicia. Systems which are now known require light emitting and sensing apparatus to be positioned where visual indicia can be read, usually horizontally opposite the carriers, preempting space which otherwise might be used for storage or work.

SUMMARY OF THE INVENTION

Disclosed in the present invention are systems which employ moveable indexing means having horizontally visible indicia for setting the apparatus and vertically reflective patches for relaying information to sensing apparatus located above the carriers and outside of useable work and storage space. The apparatus employs a simple cone or flanged plate which is loosely mounte d on the shaft of a carrier. Notches are carved out of the cone or flange. A simple detent is provided on the carrier, and a spring and wire urge the notches into holding relationship with the detent.

The energy reflecting means are mounted atop the cone or plate, and energy sources and sensing apparatus are positioned above the carriers out of the now available work and storage space.

Visual indicia are readily readable from positions opposite or below the carriers, so that workers may insure accurate settings with convenience. For the same reason, the detent and pointer means is located below the cone or plate on the carrier.

Although this invention is described for use primarily with light waves, the selective reflection of other forms of waves or other forms of energy is within the scope of this invention.

One objective of this invention is the provision of vertically reflecting coding apparatus.

This invention has as another objective the provision of coding apparatus for conveyors employing trolleys and hanger means, which coding apparatus has indexing means moveably connected to the trolley and hanger means with generally vertically reflecting means and generally horizontally visual indicia, and which has energy sources and sensors mounted above the trolley and hanger means and directed toward the reflecting means.

This invention has as another objective the provision of indexing apparatus having upper portions, lower portions and intermediate portions, with energy reflecting means on upper portions, visual indicia on intermediate portions, and stops on the lower portions.

Further objectives of this invention will be apparent from this specification, which includes the claims, and from the drawings.

DETAILED DESCRIPTION OF THE DRAWINGS

Figures 1, 2, 3, 4:
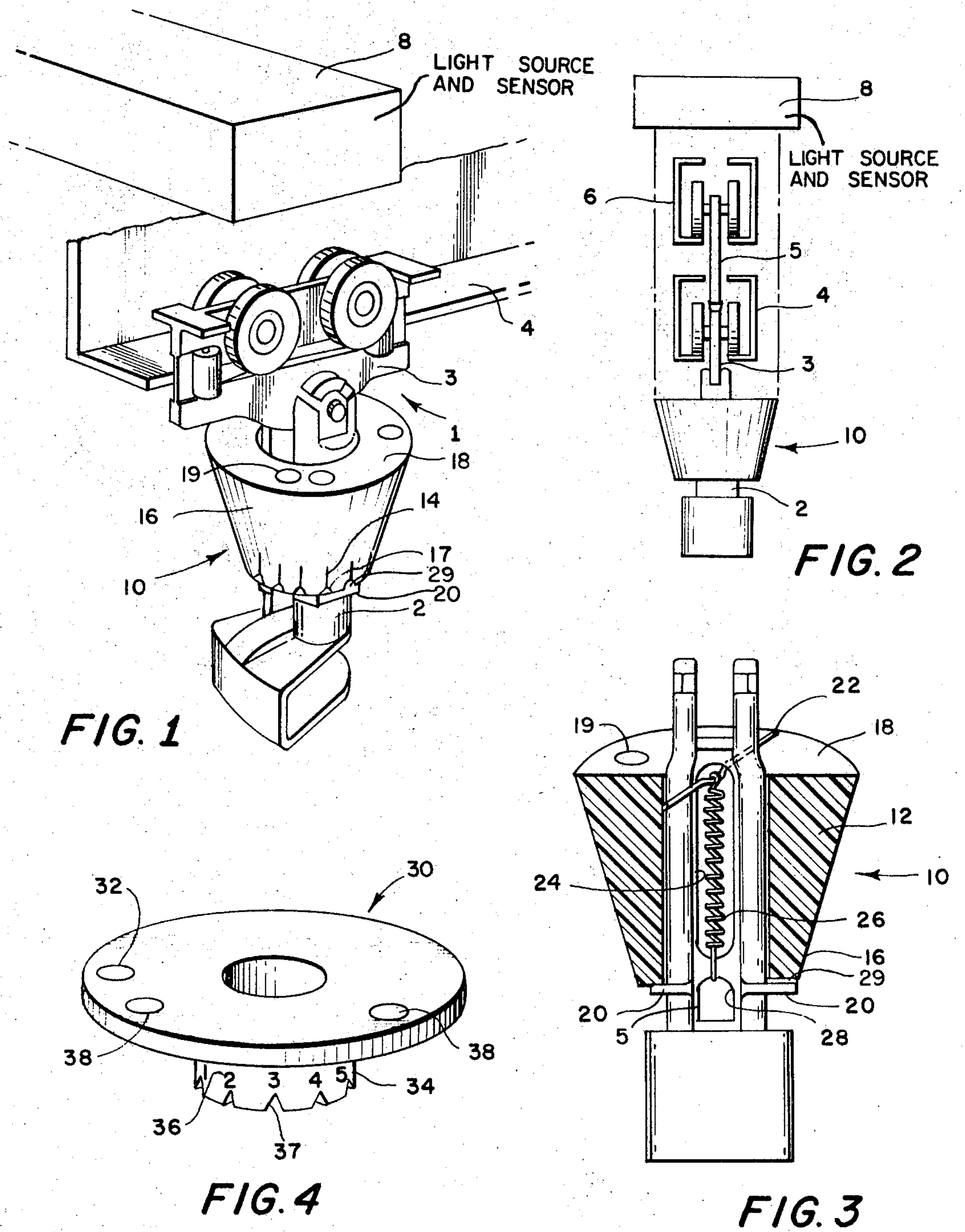
FIG. 1 is a perspective view of a trolley and carrier on which a reflective cone is mounted, and over which an energy source and receiver is mounted.
FIG. 2 is an end elevation of a trolley, pusher, carrier, coded cone, source and sensor.
FIG. 3 is a detail of the combined cone and carrier.
FIG. 4 is a detail of a flanged plate which may replace the cone.

As indicated in FIGS. 1 and 2, a material carrier, generally referred to by the numeral 1 comprises a hanger 2 and a trolley 3, which is supported in track 4. A chain-driven pusher 5 moves in parallel run 6 to engage trolley 3 and to drive it along track 4. Hanger 2 is supported by trolley 3 for carrying goods from station to station.

In order that the position of each carrier 1 may be automatically observed, telemetered and controlled, boxes 8 having conventional light sources and photosensitive devices are positioned at appropriate locations along the track.

Each carrier is coded for identification by placing an indexing apparatus 10 on a vertical shaft of a hanger. Indexing means 10 comprises cone 12 with visual indicia 14 on its sloped intermediate portion and corresponding notches 16 in the lower portion of cone 12. Three upward facing reflective patches 19 are placed on the flat upper portion 18 of upward divergent cone 12. The three patches 19 are arranged so that no more than one patch may be hidden by the track at one time.

As illustrated in detail in FIG. 3, cone 12 is held between fixed flanges 20 on hanger 2 and a retaining wire 22, which extends through a central opening 24 in hanger 2. Spring 26 resiliently urges wire 22 downward against flat upper face 18 of cone 10. The spring is anchored in bridge 28, which spans the central opening 24. Raised detent 29 on flange 20 cooperates with notches 17 on cone 10 to hold the cone at desired settings.

FIG. 4 illustrates a flanged plate 30, which may replace cone 10 in a modification of the invention. The upper portion is a flat disc 32 which is integrally formed with intermediate portion or flange 34. Indicia 36 are associated with notches 37 in the lower portion for setting the desired position of plate 30 and its light reflecting elements 38.

While the invention is described with reference to circular code setting elements, it is apparent that other devices with horizontally or downwardly readable indicia and upwardly reflecting areas may be employed. Moreover, as a complete carrier often has more than one trolley and hanger combinations, it will be obvious that coding apparatus may be associated with more than one hanger. Thus, if two coding devices are employed, each having ten settings, a total one hundred instructions may be coded on a single carrier.

Although this invention has been described with particular details and embodiments, it will be obvious to those skilled in the art that several modifications and variations may be made without departing from the spirit and scope of the invention, which is precisely defined only in the appended claims.

I claim:

1. In conveyor mounted coding apparatus for material handling conveyors which move along predetermined paths and which carry indexing means on the conveyor, with energy directing means which are movable into predetermined coded positions on the conveyors and having energy sensors adjacent the paths for determining coded positions of the conveyor mounted indexing means when the conveyors pass the sensors, the improvement comprising: indexing means having an upper portion, a lower portion, and an integrally formed intermediate portion between the upper and lower portions, energy directing means comprising energy reflecting spots fixed on visually inaccessible upper surface of the upper portion, and visual indicia fixed on a visually accessible outward facing surface of the intermediate portion and fixed angularly with respect to corresponding energy directing means, the visible indicia being visible in a first sense of direction, and the energy directing means being operative in a second relatively visibly inaccessible sense of direction angularly related to the first sense of direction.

2. The coding apparatus of claim 1 wherein the material handling conveyors comprises shaft means, and wherein the indexing means encircles the shaft means.

3. The apparatus of claim 1 wherein the lower portion defines notches associated with the indicia on the intermediate portion.

4. The apparatus of claim 1 wherein the apparatus defines a central circular opening extending through the upper, intermediate and lower portions.

5. In coding apparatus for material handling conveyors which move along predetermined paths and which carry indexing means with energy directing means which are moveable into predetermined coded positions on the conveyors, and having energy sensors adjacent the paths for determining coded positions of the indexing means when the conveyors pass the sensors, the improvement comprising: visible indicia mounted on a visibly accessible portion of the indexing means and fixed angularly with respect to corresponding energy directing means, the visible indicia being visible in a first sense of direction, and the energy directing means being operative in a second relatively visibly inaccessible sense of direction angularly related to the first sense of direction, wherein the conveyors have shaft means, and wherein the indexing means encircle the shaft means, the shaft means having a central elongated opening, wherein the shaft means has a flange means outwardly mounted on the shaft means adjacent one end of the opening, detent means mounted on the flange means in a direction of the opening, wherein the indexing means encircles the shaft in an area of the opening, a portion of the indexing means having stops associated therewith contacting the flange means and the detent means, retainer means overlying a portion of the indexing means opposite the stops, and resilient means connected to the retainer means and to the shaft means adjacent the flange means for urging the indexing means toward the flange means.

6. Coding apparatus of claim 5 wherein the shaft means is generally vertically oriented and wherein the flange means is generally horizontally oriented, wherein the indexing means defines an upper portion carrying energy directing means, a notched lower portion adjacent the flange means, and an intermediate portion interconnecting the upper and lower portions, the intermediate portion carrying visual indicia.

7. In coding apparatus for material handling conveyors which move along predetermined paths and which carry indexing means with energy directing means which are movable into predetermined coded positions on the conveyors and having energy sensors adjacent the paths for determining coded positions of the indexing means when the conveyors pass the sensors, the improvement comprising: indexing apparatus having an upper portion having a flat horizontal face, a lower portion, and an intermediate portion having a downward convergent face between the upper and lower portions, a central circular opening extending through the upper, intermediate and lower portions energy reflecting spots fixed on the upper portion, and visible indicia are fixed on the intermediate portion, the visible indicia fixed angularly with respect to corresponding energy reflecting spots, the visible indicia being visible in a first sense of direction, and the energy reflecting spots being operative in a second relatively visible inaccessible sense of direction angularly related to the first sense of direction.

8. In coding apparatus for material handling conveyors which move along predetermined paths and which carry indexing means with energy directing means which are movable into predetermined coded positions on the conveyors and having energy sensors adjacent the paths for determining coded positions of the indexing means when the conveyors pass the sensors, the improvement comprising: indexing apparatus having a horizontal disc upper portion, a radial wall lower portion, and an axial flange intermediate portion between the upper and lower portions, a central circular opening extending through the upper intermediate and lower portions, energy reflecting spots fixed on the upper portion, visible indicia are fixed on the intermediate portion, the visible indicia fixed angularly with respect to corresponding energy reflecting spots, the visible indicia being visible in a first sense of direction, and the energy reflecting spots being operative in a second relatively visibly inaccessible sense of direction angularly related to the first sense of direction.